Oct. 23, 1934.　　　O. K. KJOLSETH　　　1,978,206
WELDED RAILWAY TRUCK
Filed May 24, 1933　　　2 Sheets-Sheet 1

Inventor:
Ole K. Kjolseth,
by Harry E. Dunham
His Attorney.

Oct. 23, 1934.    O. K. KJOLSETH    1,978,206
WELDED RAILWAY TRUCK
Filed May 24, 1933    2 Sheets-Sheet 2

Inventor:
Ole K. Kjolseth,
by Harry E. Dunbar
His Attorney.

Patented Oct. 23, 1934

1,978,206

UNITED STATES PATENT OFFICE 1,978,206

WELDED RAILWAY TRUCK

Ole K. Kjolseth, Erie, Pa., assignor to General Electric Company, a corporation of New York Application May 24, 1933, Serial No. 672,596

2 Claims. (Cl. 105—194)

My invention relates to railway locomotive or car trucks of welded construction.

An object of my invention is to provide a locomotive or car truck of improved mechanical construction and of a design which greatly simplifies the manufacture and reduces the cost of production.

Further objects and advantages of my invention will become apparent as the following description proceeds and the features of novelty which characterize my invention will be pointed out with particularity in the claims annexed to and forming a part of this specification.

Figure 1:
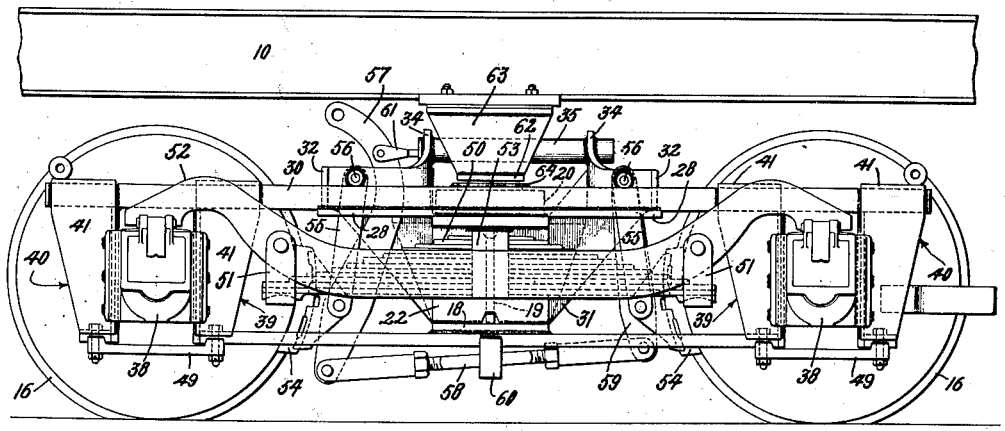
Figure 2:
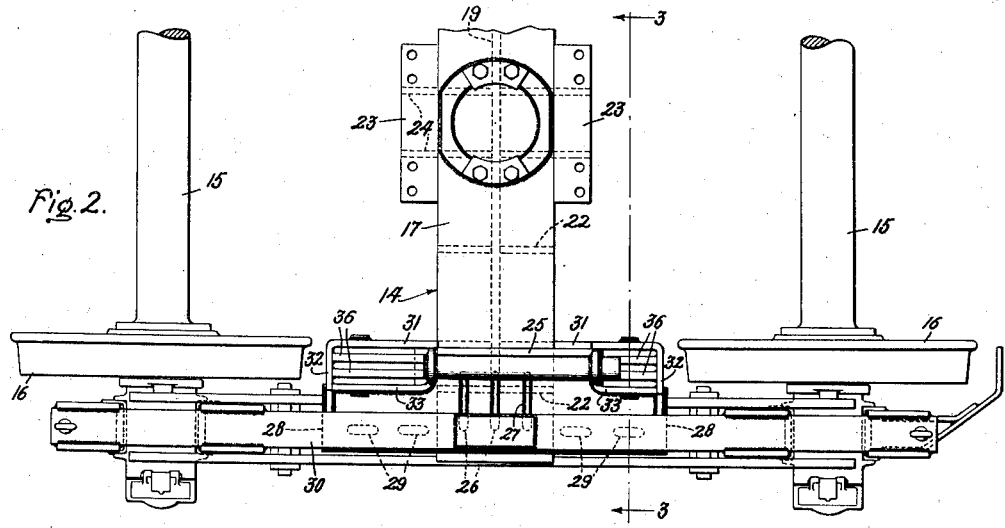
Figure 3:
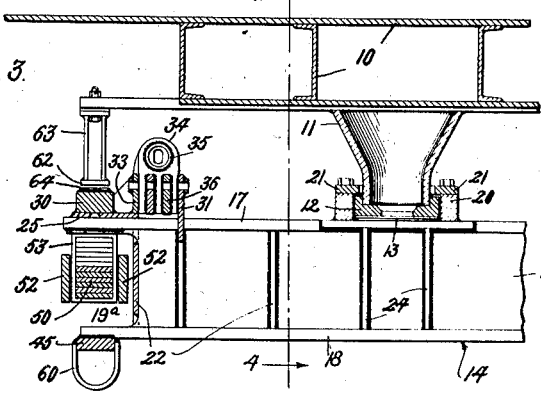
Figure 4:
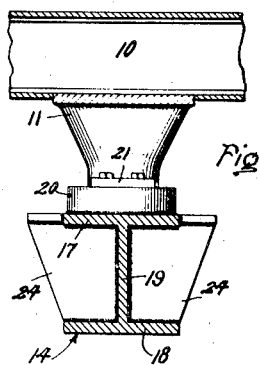
Figure 5:
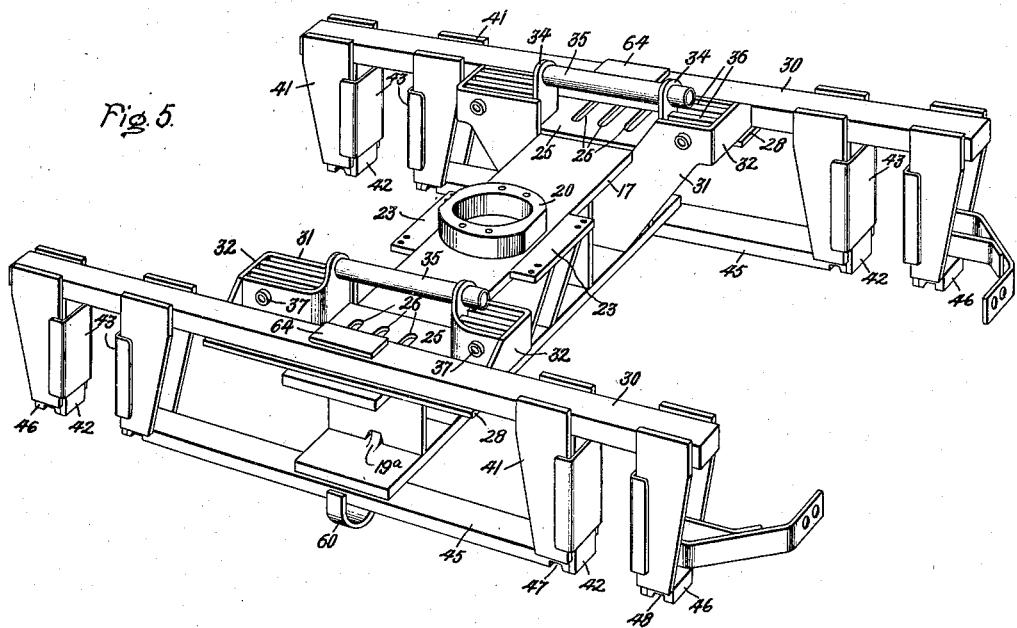
Figure 6:
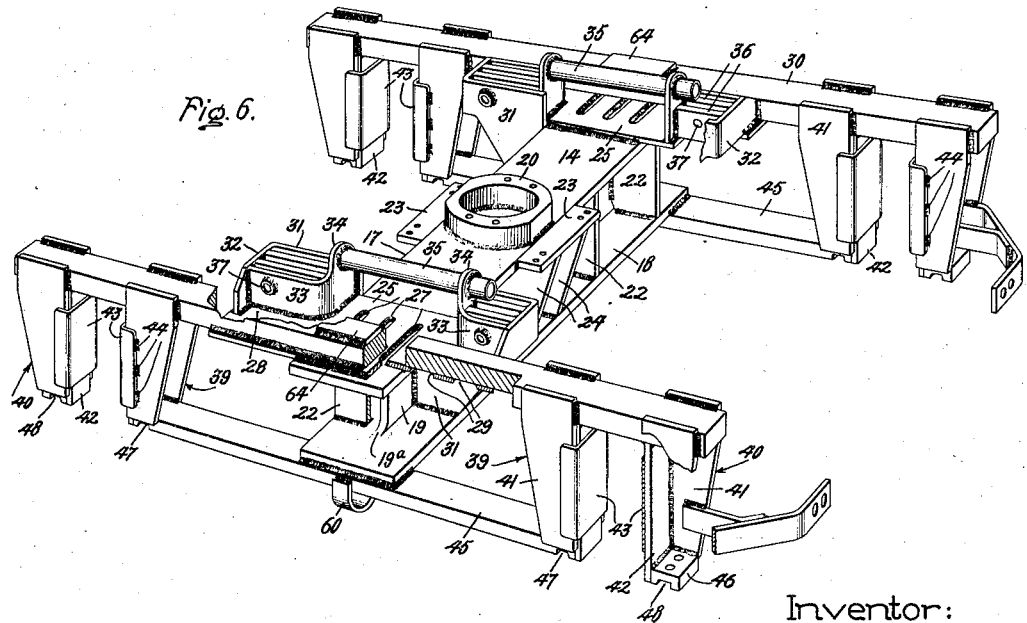

For a better understanding of my invention reference may be had to the accompanying drawings in which Fig. 1 is a side elevation of a truck embodying my invention; Fig. 2 is a plan view of a part of the truck shown in Fig. 1; Fig. 3 is a cross-sectional view on the line 3—3 of Fig. 2 with the truck center-plate, body center-plate, and center pin also shown in section; Fig. 4 is a cross-sectional view on the line 4—4 of Fig. 3; Fig. 5 is a perspective view of my improved truck construction showing an assembly of the parts used in the welded structure; and Fig. 6 is a perspective view of the structure shown in Fig. 5 partly in section and showing the welded joints of the several parts.

Referring to the drawings, in Figs. 1 to 4 I have shown a locomotive or car underframe 10 supported by a center pin 11 provided with a bearing 12 and resting on a bearing plate 13 welded to a bolster 14 of a truck which is spring borne on axles 15 and wheels 16.

In accordance with my invention the bolster 14 is constructed from an H-beam, or other suitable beam, having upper and lower flanges 17 and 18, respectively, connected by a vertical web 19. The web 19 is cut out at the ends of the beam so as to terminate within the ends of the flanges and form notches as indicated at 19a to receive springs and equalizers. The center pin bearing plate 13, which is welded on the flange 17, is surrounded by a center pin retaining ring 20 also welded to the bolster. A ring 21 is bolted to the top of the ring 20, so as to retain the bearing 12 within the ring 20 and to retain the center pin 11 in position. The H-beam is reinforced by gussets 22 extending between the flanges 17 and 18 and welded thereto and to the web 19. Motor supports 23 are welded to the upper flange 17 on either side of the center thereof and reinforced by gussets 24 welded to the supports and to the webs and flanges of the H-beam.

The side frames of the truck are of a fabricated welded construction. This welded construction includes plates 25 provided with elongated openings 26 and welded to the flange 17 across the ends thereof, the openings 26 being provided in order that additional welds may be made along their edges as indicated at 27. The plates 25 have arms 28 extending from the sides of the bolster 14 and are provided with openings 29 providing additional welding surfaces, and main bars 30 of the side frames are welded to the plates 25. The main side frame bars 30 are further reinforced by brake hanger supports, which include plates 31 extending above the top of the bolster and welded to the web and flanges of the H-beam and to the plates 25 and having bent portions 32 above the arms 28 and welded to the arms 28 and to the bars 30. Angle pieces 33 are welded to the plate 25 and along the arms 28 thereof and have lugs 34 which carry spring retaining cylinders 35 welded in openings provided therefor. The brake hanger supports include short rectangular pieces 36 welded in the space between plates 31 and angle pieces 33, the supports being drilled at 37 to provide for the hanger pivots.

Pedestals engaging journal boxes 38 are provided near the ends of the bars 30 and comprise inner pedestal jaws 39 and outer pedestal jaws 40. The inner jaws and outer jaws are of similar construction with the respective parts arranged back to back. Each pedestal jaw, as can be seen in Figs. 5 and 6, includes side plates 41 extending slightly above the top of bar 30 and welded thereto, a cross plate 42 welded between the side plates, and a pedestal bearing plate 43 which is a channel welded to the side plates at 44. The side frames also include bracing bars 45 welded to the ends of the flanges 18 of the H-beam and the lower ends of the inner pedestal jaws 39 are welded to the ends of these bracing bars. Blocks 46 are welded to the lower ends of the jaws 40. The ends of the bracing bars 45 and the blocks 46 are grooved at 47 and 48 respectively and drilled in order that pedestal tie bars 49 may be bolted thereto as shown in Fig. 1.

The truck frame is spring borne on axles 15 and wheels 16 by leaf springs 50 on which the ends of the upper flange 17 of the H-beam rest, and these springs are suspended at their ends on hangers 51 from equalizer bars 52 which rest on journal boxes 38. The springs 50 are retained in position with respect to the bolster 14 by clips 53 welded to the upper flange 17 of the H-beam. The load carried by the truck is transmitted through the leaf springs 50 and spring hangers 51 to the equalizer bars 52 and thence to the wheels and axles through the journal boxes 38.

Brake shoes 54 are arranged to be moved into and out of engagement with the wheels by a brake rigging including brake shoe levers 55 suspended from the hanger brackets on pins 56. Braking force is applied through a brake lever 57 pivoted to the shoes which engage the wheels on one axle and an adjustable equalizing bar 58 and the operating lever 59 for the brake shoes 54, which engage the wheels on the other axle. Brake rod emergency supports 60 are welded to the bracing bars 45 to prevent dropping of the brake rods to the roadbed should a connection be broken. Rods 61 pivoted to the brake operating lever are provided to compress springs within the spring retaining cylinders 35 whenever the brake operating levers are moved to the brake operating position. These springs will retract the brake shoes from the wheels whenever the pressure is removed from the brake operating levers.

Lateral stability of the car underframe is obtained by providing side bearings 62 welded to extensions 63 at the sides of the underframe on either side of the center pin, which engage side bearing plates 64 welded on top of the side frame bars 30.

In view of the foregoing it will be apparent that I have provided a simple fabricated truck construction in which the joints are securely welded together and all the parts are thoroughly reinforced, and that I have provided a truck construction which can be readily manufactured.

Although I have disclosed a particular embodiment of my invention, modifications will occur to those skilled in the art. I do not, therefore, desire my invention to be limited to the embodiments shown and described and I intend in the appended claims to cover all modifications thereof which do not depart from the spirit and scope of my invention.

What I claim as new and desire to secure by Letters Patent of the United States is:

1. A truck including a plurality of wheels and axles, journal boxes on said axles, a unitary frame structure comprising a bolster, said bolster being in the form of a beam having upper and lower flanges and a connecting web terminating within the opposite ends of said flanges to form notches, side frames attached to the upper and lower ends of the flanges of said beam, and means including springs arranged in the notches between the upper and lower flanges of said beam and supporting said bolster through the upper flange of said beam for resiliently supporting said truck frame on said wheels and axles.

2. A truck including a plurality of wheels and axles, journal boxes on said axles, a unitary frame structure comprising a bolster, said bolster being in the form of a beam having upper and lower flanges, and a connecting web terminating within the opposite ends of said flanges to form notches, side frames attached to the upper and lower ends of the flanges of said beam, and means including springs arranged in the notches between the upper and lower flanges of said beam and supporting said bolster through the upper flange of said beam for resiliently supporting said truck frame on said wheels and axles, said means also including equalizers supported on said journal boxes and connected to the opposite ends of said springs.

OLE K. KJOLSETH.